Patented Aug. 10, 1937

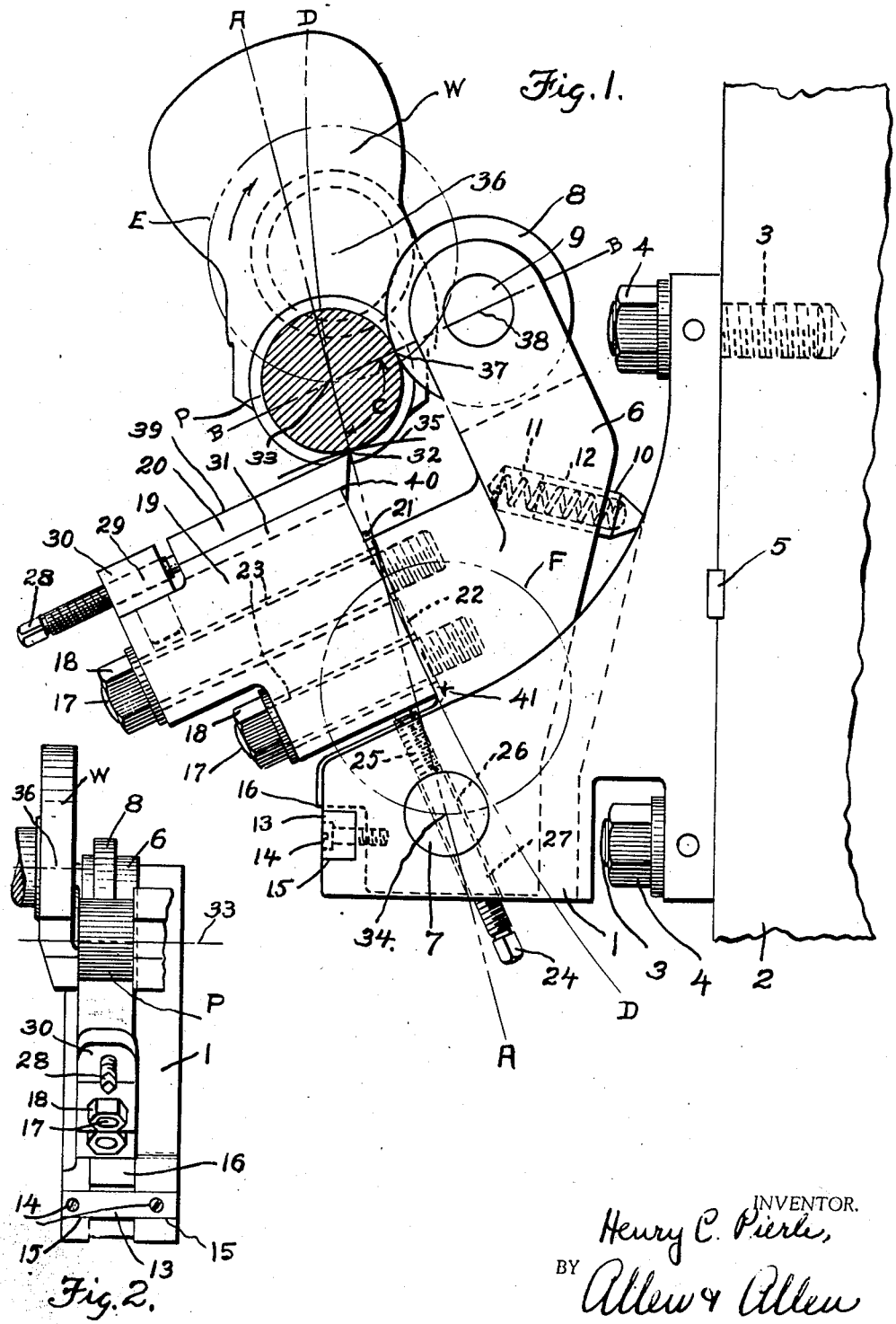

2,089,421

UNITED STATES PATENT OFFICE 2,089,421

TOOL HOLDER FOR LATHES

Henry C. Pierle, Cincinnati, Ohio, assignor to The R. K. Le Blond Machine Tool Company, Cincinnati, Ohio, a corporation of Delaware Application February 18, 1936, Serial No. 64,523

20 Claims. (Cl. 82—9)

My invention pertains to tool holders for lathes, and more particularly to tool holders adapted to be used on the class of lathes known as crankshaft lathes.

These tool holders are adaptable to machining the line bearings, pin bearings and associated surfaces of crank shafts.

An object of my invention is to provide a tool holder for carrying a cutting tool in working engagement with a work piece in such a way that substantially all radial thrust and distortion are eliminated from the work piece during cutting operations.

Another object is to rest the tool holder upon the work piece being machined in such a manner that irregularities in the surface of the work piece upon which the tool holder rests will have substantially no effect upon the smooth cutting action of the tool and the proper sizing of the work.

Another object of my invention is to provide a tool holder of this type which is susceptible to feeding actions under the influence of external feeding means, and without change of the relative positions of the elements of the tool holder.

Another object is to provide a relatively short tool holder having a pivoting action and floatingly supported on the work piece, the cutting tool being located in a definite relation to the pivot and the position of contact of the tool holder on the work piece.

I also provide means whereby the pivot point of the tool holder is carried in a predetermined eccentric path or other predetermined paths so as to produce a surface of revolution on a work piece which will also exactly follow said predetermined paths. I am thus able, for example, by moving the pivot points of several tool holders in suitable orbital paths, to machine the crank pins of a crank shaft simultaneously.

I am also able by my unique arrangement of pivoted tool holders to machine all of the pins of a multiplicity of crank shafts simultaneously with a minimum of strain upon the work pieces and to produce finished surfaces within high limits of accuracy.

These tool holders are well adapted to machining work surfaces which are not eccentric, as for instance, to the machining of the line bearings and associated surfaces of crank shafts.

Another object of my invention is to provide a very simple form of tool which can be easily sharpened and which is very accessible and easily inserted or removed from the tool holder, a requisite very necessary in high production machine tools.

In order to specifically illustrate typical applications of my invention to lathes of the crank shaft type, I show the tool holder applied to lathes for turning crank pins as covered in Patents 1,934,530, 1,993,994, and 1,993,995. However, while I restrict my illustrations herein to these particular types of orbital lathes, it is to be clearly understood that this invention is applicable to any lathe, whether of the orbital type or of a type wherein the surface of the work to be machined is concentric with the spindle axis of the lathe.

Other features and advantages of my invention will be set forth in the description to follow.

In the drawings:

Figure 1 is an enlarged elevation of the tool holder as viewed axially of the work piece. As here illustrated, the tool holder is shown applied to machining a crank pin of a crank shaft.

Fig. 2 is a view of the tool holder and work piece as seen from a position perpendicular to the axis of the work piece.

Figure 3:
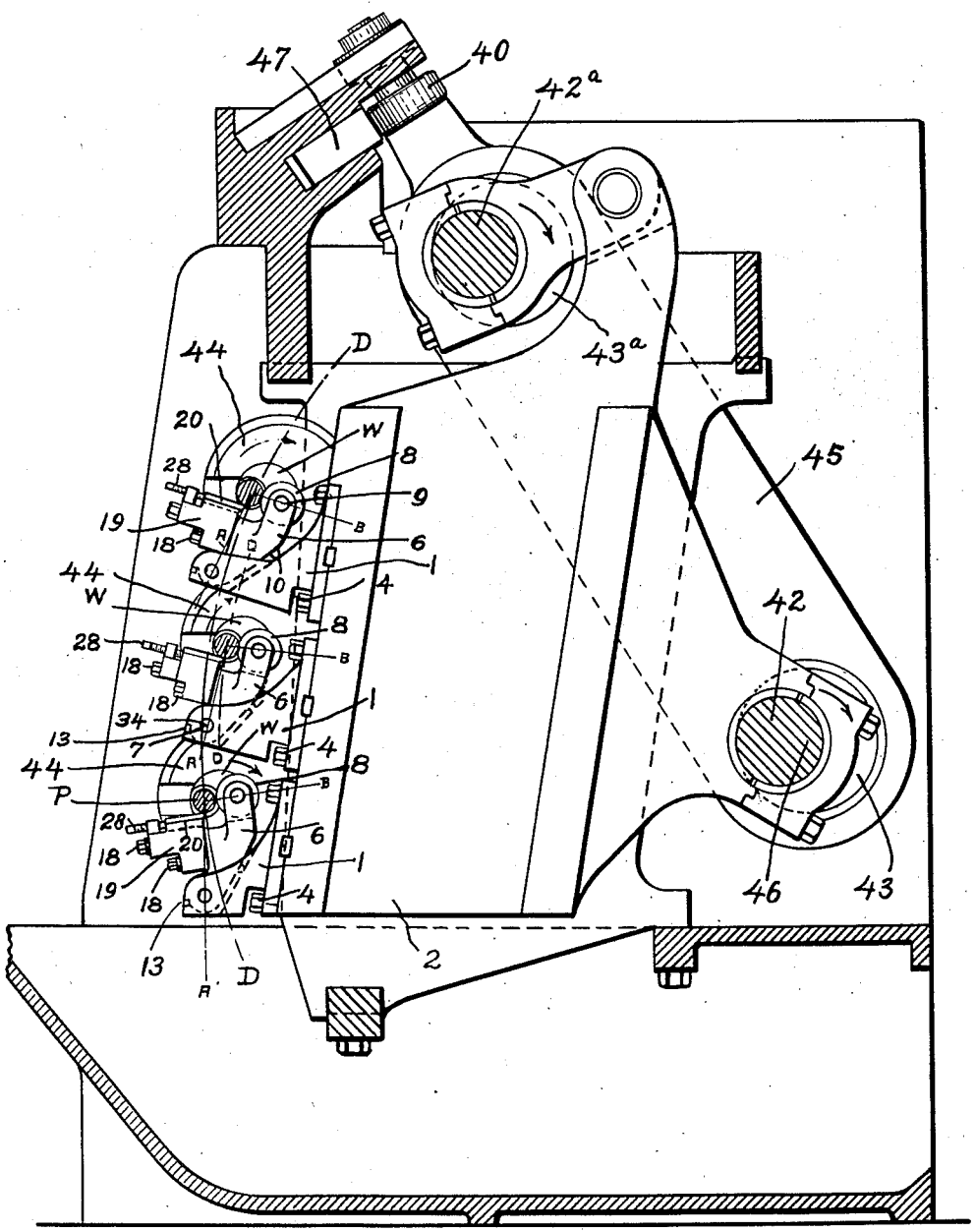
Fig. 3 is a vertical transverse section showing one of the tool carrying frames with the tool holders and tools in finishing position as applied to a machine illustrated in Fig. 4 of Patent 1,934,530.

The tool holder comprises a pivot supporting member or bracket 1, which is either an integral part of the tool carrying frame 2 or is a separate member bolted to the tool carrying frame by means of the studs 3 and nuts 4 in a usual manner. A key 5 fitting in slots in the frame 2 and pivot supporting member 1 is utilized to assist the bolting means in securing the member 1 immovably to the frame 2.

A pivoting member 6, free to swing on a pin 7 carried in the bracket 1, has a roller 8 carried on a stud 9 in its end opposite the pivoted end. A plunger 10, slidingly fitted in a suitable hole 11 in the pivoting member 6 is urged outward by a spring 12 so that the outer end of the plunger is always held in contact with the pivot supporting bracket 1, the purpose of this arrangement being constantly to urge the member 6 with its roller 8 toward the work piece and lightly to hold the roller 8 in contact with the work during the initial cutting operation. In order to prevent the spring plunger 10 from moving the member 6 too far toward the work W, when the roller is retracted from the work piece at the starting position of the cutting tools, a stop is provided comprising a bar 13 bolted by means 14 in suitable slots 15 in the bracket 1, which coacts with an integral lug or abutment 16 of the pivoting member 6.

Secured to the pivoting member 6 by suitable studs 17 and nuts 18 is a tool block 19 carrying the usual vertical form tool 20. A tongue 21, formed integral with the tool block 19, fits slidingly in a slot 22 in the member 6 so that the block 19 may be moved substantially radially of the axis of the work piece W. Elongated holes 23 are provided in the block 19 so that the block may be adjusted when the nuts 18 on studs 17 are loosened. An adjusting screw 24, fitted in a tapped hole 25 in the member 6 and passing through a clearance hole 26 in the pivot pin 7 and a clearance hole 27 in member 6, provides means for accurately adjusting the tool block 19 along the slot 22.

A back-up screw 28, fitted in a tapped hole 29 in a back-up block 30 fixed in the tool block 19, provides means for adjusting the tool 20 in the dovetail guides 31 provided in block 19 substantially tangentially of the surface of the work piece.

It is to be noted that when properly adjusted the tool point 32 should be on the line A—A which passes through the center 33 of the work surface being turned and the center 34 of the pivot point 7. By this arrangement the tool is adapted to swing in an arc 35 tangent to the work piece at the normal cutting position 32 of the tool point. It can be seen that when the tool swings in the arc 35 a relatively small amount either side of the line A—A that practically no change will result in the distance of the tool point 32 from the center 33, which relationship determines the diameter of the crank pin P and its position relative to the main axis of rotation 36 of the work crank shaft W.

The roller 8 bears against the work piece at a point 37 which of necessity is on the line B—B passing through the center 33 of crank pin P and the center 38 of the roller pin 9. Preferably, the angle C between the lines A—A and B—B should be 90° or greater, depending upon the diameter of the work surface being finished and the characteristics of the material. The cutting angles of the faces 39 and 40 of the tool 20 will likewise vary according to the nature of the work piece.

After the tool 20 has been properly adjusted the relationship of the points 32, 33, 34, and 38 all remain fixed relative to each other during the machining operations. Feeding of the cutting tool toward the work to cause cutting action and reduction in diameter of the work piece is accomplished by causing relative movement between the tool and work piece along the line A—A, as in the case of a machine wherein the relative movement is in a straight line as illustrated in Fig. 2 of Patent 1,993,995 or along the arc D—D which passes through the points 32 and 33 as in the case of machines having arcuate relative movement as illustrated in Fig. 4 of Patent 1,934,530 and Fig. 3 of Patent 1,993,994. It is to be noted that in the latter cases of arcuate relative feeding the arcuate path D—D passes through the points 32 and 33, but does not necessarily pass through the center 34 of the pivot pin 7.

In machining an eccentric portion of a work piece, as for example, the crank pin P of the work crank W in Fig. 1, the center 33 of which describes an orbital path E about the main axis 36 of the crank shaft, it is only necessary to cause the center 34 of the pivot pin 7 to follow an orbital path F of a diameter equal to that of the orbital path E described by the center 33 of the crank pin P. The center 34 of the pivot pin 7 will then describe the circle F about an imaginary center 41, which center 41 is equivalent to the center or main axis of rotation 36 of the work crank shaft W.

When it is desired to machine a series of crank pins P on a crank shaft W, while at the same time maintaining the points 32, 33, 34, and 38 in the same relative positions for each of the respective tool holders for each of the pins to be machined, it is necessary that the centers 34 of the pivot pins 7 of each tool holder describe orbits F equal to the diameter of orbit E of the crank pins P, and that the centers 41 of the various orbits F coincide. This requirement, however, is not essential where the various tool holders are properly adjusted to accommodate for conditions where the centers 41 of the orbital paths F do not coincide.

Figure 4:
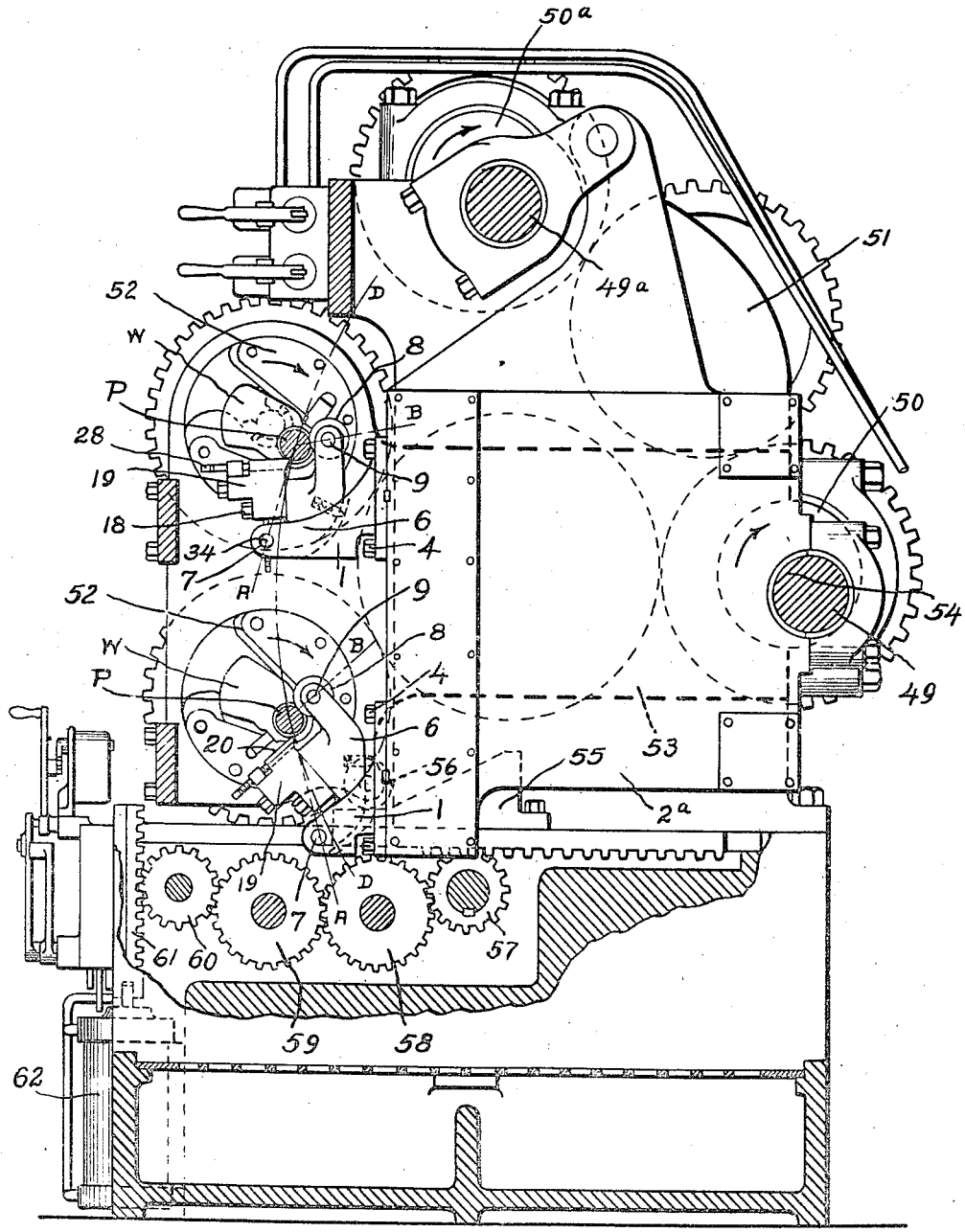
Fig. 4 is a vertical transverse section showing one of the tool carrying frames with the tool holders and tools in finishing position as applied to a machine illustrated in Fig. 3 of Patent 1,993,994.

In Fig. 3 is illustrated one type of orbital lathe to which my invention is adapted. The tool carrying frames 2, to which are bolted the tool holders by means of the studs 3 and nuts 4 as described, are carried on the pins 42 and 42a of a pair of master crank shafts 43 and 43a, which shafts are rotated in synchronism with the rotatable chucking devices 44 for the work pieces W. The tool carrying frames 2 are mounted on the crank pins 42 and 42a in a manner fully disclosed and claimed in Patents 1,744,885, Re. 18,662, and 1,934,530, so that as the master cranks 43 and 43a are rotated the tool carrying frames 2 will be moved in an orbital path so that any point on said frames 2 will describe an orbit whose diameter equals the diameter of the circle E (Fig. 1) described by the centers of the pins P of the work pieces W. Since the centers 34 of the pivot pins 7 constitute a point on the orbitally moving tool carrying frames 2 and fixed thereto, these centers 34 will be given orbital travel in the orbit F (Fig. 1) to produce the proper motion in the tool holder for machining an eccentric portion or crank pin P of the work crank shaft W. Feeding of the tools 20 upon the work piece is provided by moving the tools toward the work along arcuate paths D—D. The upper master crank 43a is carried in a cradle member 45 pivoted about the axis 46 of the lower master crank shaft 43 and actuated at its upper end by a cam 47 operating against a roller 48 fixed to the cradle 45, the details of this arrangement being fully described and claimed in Patent 1,934,530.

Another application of my invention to an orbital lathe is illustrated in Fig. 4, wherein a tool carrying frame 2a, having the tool holders of my invention bolted thereto by means of the studs 3 and nuts 4 as described, is carried on the pins 49 and 49a of a pair of master crank shafts 50 and 50a, respectively. Both master crank shafts 50 and 50a are journaled in suitable bearings fixed in the housings 51 and are rotated therein in synchronism with suitable chucking devices 52 as fully described and claimed in Patent 1,933,-994. The tool carrying frames 2a in this machine have only orbital movement which cause the cutting tools 20 to follow the eccentric portion of the work piece. Relative feeding between the work and tool in this machine is produced by swinging the work W held in the chucking devices 52 to or from the cutting tools 20 along the line D—D. In this particular adaptation the chucks 52 are carried in a cradle 53 pivotally mounted about the main axis 54 of the master crank shaft 50. The cradle is moved by means of the cam 55 and roller 56 attached to the cradle 53, by means of the gearing 57, 58, 59, and 60 actuated by a suitable rack 61 attached to the hydraulic feed cylinder 62. The details of the construction and arrangement of the above feeding mechanism is fully disclosed in Patent 1,993,994.

Figure 5:
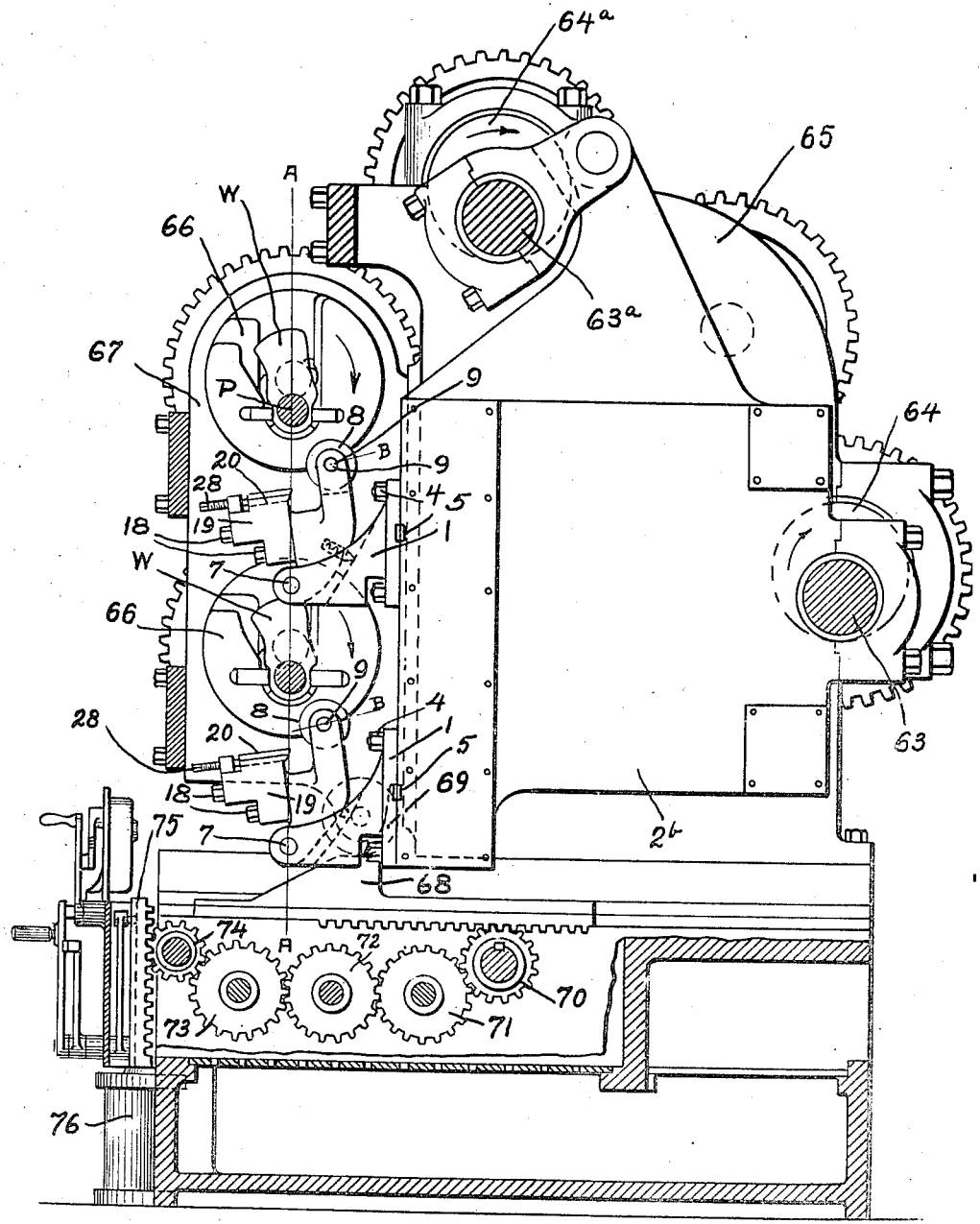
Fig. 5 is a vertical transverse section showing one of the tool carrying frames with the tool holders and tools in starting or retracted position as applied to a machine illustrated in Fig. 2 of Patent 1,993,995.

My invention is also well adapted to a lathe wherein relative feeding of the work and tools is along a straight line A—A. Referring particularly to Fig. 5, the tool carrying frame 2b, having the tool holders of my invention bolted thereto by means of the studs 3 and nuts 4 as described, is carried on the pins 63 and 63a of the master crank shafts 64 and 64a, respectively. Both master crank shafts 64 and 64a are journaled in suitable bearings fixed in the housings 65 and are rotated therein in synchronism with the chucking devices 66 for gripping and rotating the work piece W in a manner fully described and claimed in Patent 1,993,995. The tool carrying frames 2b in a machine here illustrated have only orbital movement to cause the cutting tools 20 to follow the eccentric portion of the work piece. Relative feeding between the work and tool in this machine is produced by moving the work to or from the cutting tools along the straight line A—A. In this adaptation the chucking devices 66 are journaled in a carriage 67, which carriage 67 is raised or lowered along the line A—A by means of the cam 68 coacting with the roller 69 attached to the carriage 67; the cam 68 being moved by means of suitable gearing 70, 71, 72, 73, and 74 operated by the rack 75 attached to the feed cylinder 76. Complete detailed description of this arrangement is fully given in Patent 1,993,995.

It can be clearly seen from the above description that this novel tool holder is well adapted for application to any type of orbital lathe having two master crank shafts for producing orbital motion in the cutting tool and in which relative feeding between the tool and work piece is produced either along a straight path or an arcuate path of relative travel. It is also to be clearly understood that this invention is well adapted to lathes not of an orbital character wherein relative feeding between the tool and work piece is produced either along a straight path or an arcuate path of relative travel. This invention is especially well adapted to lathes having a multiplicity of work spindles. It is also to be clearly noted that the cutting tools 20 as shown in the various illustrative examples are presented toward the front of the lathes which greatly facilitates adjusting and changing tools with a minimum loss of time and effort on the part of the operator.

Having now set forth the nature of my invention and illustrative examples of adaptation of this invention, what I claim is:

1. In an orbital crank shaft turning lathe for turning crank pins, the combination of a rotatable work supporting and driving means, a pair of master crank shafts having pins with throws which are replicas of the throws of the pins of the work crank shaft held in said supporting and driving means, tool carrying frames mounted on the pins of the master crank shafts, relatively short tool holders pivotally mounted on said tool carrying frames, said tool holders being provided with supporting means resting upon the pins of the work crank shaft, cutting tools mounted on said tool holders to coact with the work in opposed relation to said supporting means, means for rotating said work supporting and driving means and said master crank shafts in synchronism, and means for producing relative feeding between the work and said cutting tools.

2. In an orbital crank shaft lathe for turning crank pins, the combination of a work carriage mounted for feed travel, feed means for said work carriage, work supporting and driving means on said work carriage, a pair of master crank shafts having pins with throws which are replicas of the throws of the pins of the work crank shaft, tool carrying frames mounted on the pins of said master crank shafts, relatively short tool holders pivotally mounted on said tool carrying frames and resting upon the pins of the work crank shaft, cutting tools mounted on said tool holders to coact with the work in opposed relation to the portion of the tool holder resting upon the pins of the work crank shaft, and driving connections for said master crank shafts and work supporting and driving means whereby they are rotated in synchronism.

3. In an orbital crank shaft lathe for turning crank pins, the combination of a series of work supporting and driving means, a pair of master crank shafts having pins with throws which are replicas of the throws of the pins of a series of work crank shafts held in said supporting and driving means, tool carrying frames mounted on the pins of said master crank shafts, relatively short tool holders pivotally mounted on said tool carrying frames, said tool holders being provided with supporting rollers resting upon the pins of the work crank shafts, cutting tools mounted on said tool holders to coact with the pins of the work crank shafts in opposed relation to said supporting rollers, driving connections for said master crank shafts and work supporting and driving means whereby they are rotated in synchronism, and means for causing relative feeding between said cutting tools and the work crank shafts.

4. In a lathe, the combination of a rotatable work holder, a pair of master crank shafts having throws which are replicas of the throws of a work piece in said work holder, a tool carrying frame mounted on the throws of said master crank shafts, tool holders pivotally mounted on said tool carrying frame and resting upon the throws of the work piece, cutting tools mounted on said tool holders, means for driving said master cranks and work holders in synchronism, and means for producing relative feeding of the cutting tools and work piece.

5. In a lathe, the combination of a series of rotatable work holders for gripping a series of work pieces, a pair of master crank shafts having throws which are replicas of the throws of the work pieces in said work holders, tool carrying frames mounted on the throws of said master crank shafts, tool holders pivotally mounted on said tool carrying frames, and resting upon the throws of the work piece, cutting tools mounted on said tool holders, means for driving said master cranks and work holders in synchronism, and means for producing relative feeding of the cutting tools and work pieces.

6. In a lathe, a rotatable work holder, a tool holder pivoted at its outer end and resting upon and floatingly supported by a work piece in said work holder, a cutting tool mounted on said tool holder to engage the work in an opposed relation to the point of engagement of the tool holder therewith, and means for producing relative feeding between the cutting tool and work piece by moving the axis of the pivot of the tool holder relative to the axis of rotation of the work surface being turned along a straight line passing through the axis of the pivot, the tool point and the axis of rotation of the work surface being turned.

7. In a lathe, a rotatable work holder, a tool holder pivoted at its outer end and resting upon and floatingly supported by a work piece in said work holder, a cutting tool mounted on said tool holder to engage the work in an opposed relation to the point of engagement of the tool holder therewith, and means for producing relative feeding between the cutting tool and the work piece by moving the axis of the pivot of the tool holder substantially in an arcuate path passing through the tool points and the axis of rotation of the work surface being turned.

8. In a multiple crank shaft lathe for cutting a series of crank pins simultaneously on a series of crank shafts, the combination of a series of chucks arranged in a desired line to support and rotate a series of crank shafts in said line with each other, a series of tool carrier units arranged in a series in a right angle plane to the crank shafts to be cut, a series of tool holders pivotally mounted on said units and resting upon the pins of the work crank shafts, tools on each of said tool holders arranged in a like line with the series of chucks, and means for imparting orbital movement to the tool holders.

9. A lathe according to claim 8, having means for effecting a relative bodily movement of the chucks as a unit and the tool holders as a unit.

10. In a multiple crank shaft lathe, for turning a plurality of crank pins on each one of a plurality of crank shafts simultaneously, a work support, tool supports, one for each crank pin on a shaft, a plurality of work holders rotatable on parallel axes on said work support, one for each shaft, a plurality of tool holders pivotally mounted on said tool supports and contacting the work, tools on each tool holder arranged in an opposed relation to the point of contact of said tool holder on the work, at least one for each work holder, said supports being relatively movable along a desired line in a plane at right angles to the work holder axes, and the tools being arranged for relative approach of the tools and the respective work holders in the general direction of said line of relative movement in said plane, and means carrying the tool supports and operatively connected to the work holders, imparting orbital movement to the tool supports in said plane in synchronism with the rotation of the work holders.

11. In a lathe, the combination of a rotatable work holder, means for rotating said work holder, a pivotally mounted tool holder, the axis of pivoting of said tool holder being located substantially in a plane defined by the axis of rotation of the work holder and the cutting edge of a tool in said tool holder, said tool holder contacting a work piece in said work holder, resilient means for maintaining said contact, and means for causing relative feeding between said tool and the work piece.

12. In a lathe, the combination of a rotatable work holder, means for rotating said work holder, a pivotally mounted tool holder, the axis of pivoting of said tool holder being located substantially in a plane defined by the axis of rotation of the work holder and the cutting edge of a tool in said tool holder, said tool holder contacting a work piece in said work holder, resilient means for maintaining said contact, means for moving said tool holder so as to conform the tool to an eccentric portion of the work piece, and means for causing relative feeding between said tool and work piece.

13. In a lathe for orbital turning, a tool holder, means independent of the work piece being turned for causing said tool holder as a whole to move in an orbital path following the work, and means for resting said tool holder on the work so that said work may cause tilting movements of said tool holder while said tool holder as a whole follows said orbital path.

14. In a lathe, the combination of a rotatable work holder, means for rotating said work holder, a tool holder block, a tool holder mounted in the tool holder block and a tool in said tool holder, said tool holder being pivotally mounted on said block at a point lying substantially in a plane passing through the axis of rotation of the work holder and the cutting edge of the tool, means for causing relative feeding between said tool and a work piece in the work holder, and means for maintaining the cutting edge of the tool substantially in said plane during said relative feeding.

15. In a lathe, the combination of a rotatable work holder, means for rotating said work holder, a tool holder block, a tool holder mounted in said tool holder block and a tool in said tool holder, said tool holder being pivotally mounted on said block at a point lying substantially in a plane passing through the axis of rotation of the work holder and the cutting edge of the tool and contacting a work piece in the work holder at a point lying substantially in a plane passing through the axis of rotation of the work holder perpendicular to said first mentioned plane, and means for causing relative feeding in said first mentioned plane between said tool and a work piece in the work holder.

16. In a lathe for orbital turning, a tool holder, a tool in the tool holder, means independent of the work piece being turned for causing said tool holder as a whole to move in an orbital path following the work and pivotal mounting means for the tool holder permitting the cutting edge of said tool to swing in an arcuate path tangent to the work surface being machined while said tool holder as a whole follows said orbital path.

17. In a lathe for orbital turning, a tool holder, a tool in the tool holder, means independent of the work piece being turned for causing said tool holder as a whole to move in an orbital path following the work, pivotal mounting means for the tool holder permitting the cutting edge of said tool to swing in an arcuate path substantially tangent to the work surface being turned, means dependent upon the work piece to control said swinging in said arcuate path while said tool holder as a whole follows said orbital path.

18. In a lathe for orbital turning, a tool holder, a tool in the tool holder, means independent of the work piece being turned for causing said tool holder as a whole to move in an orbital path following the work, and a means dependent upon the work piece to move the cutting edge of said tool tangentially of the work surface being machined while said tool holder as a whole follows said orbital path.

19. In a lathe, the combination of a rotatable work holder, means for rotating said work holder, a tool holder block, a tool holder in said tool holder block and a tool in said tool holder, means for causing relative feeding of the tool and a work piece in said work holder, and means dependent upon the work piece to move the tool tangentially of the surface of the work piece being turned during the relative feeding of said tool and work piece.

20. In a lathe, the combination of a rotatable work holder, means for rotating said work holder, a tool holder, a tool in said tool holder, means independent of a work piece in the work holder for causing relative feeding of the work and tool along a predetermined path of travel, and means dependent upon the work piece to actuate said tool in a path of travel substantially perpendicular to said first mentioned path of travel during said relative feeding of the work and tool.

HENRY C. PIERLE.